United States Patent
Johnson

(10) Patent No.: US 7,653,821 B2
(45) Date of Patent: *Jan. 26, 2010

(54) SYSTEM AND METHOD FOR VIRTUAL TAPE MANAGEMENT WITH REMOTE ARCHIVAL AND RETRIEVAL VIA AN ENCRYPTED VALIDATION COMMUNICATION PROTOCOL

(76) Inventor: R. Brent Johnson, Limmatquai 50, Zurich (CH) 8001

( * ) Notice: Subject to any disclaimer, the term of this patent is extended or adjusted under 35 U.S.C. 154(b) by 281 days.

This patent is subject to a terminal disclaimer.

(21) Appl. No.: 11/870,917

(22) Filed: Oct. 11, 2007

(65) Prior Publication Data

US 2008/0034225 A1    Feb. 7, 2008

Related U.S. Application Data

(63) Continuation of application No. 10/457,133, filed on Jun. 9, 2003, now Pat. No. 7,293,179, and a continuation-in-part of application No. 09/971,244, filed on Oct. 4, 2001, now Pat. No. 7,080,260, and a continuation-in-part of application No. 09/918,900, filed on Jul. 31, 2001, now Pat. No. 6,578,146.

(51) Int. Cl.
*G06F 21/00* (2006.01)
*H04L 29/06* (2006.01)

(52) U.S. Cl. .................... 713/193; 707/204; 726/3

(58) Field of Classification Search ............... 713/193; 711/161, 162, 4; 707/204
See application file for complete search history.

(56) References Cited

U.S. PATENT DOCUMENTS

| | | | |
|---|---|---|---|
| 5,598,536 A | 1/1997 | Slaughter, III et al. | |
| 5,659,614 A * | 8/1997 | Bailey, III | 713/165 |
| 6,070,224 A | 5/2000 | LeCrone et al. | |
| 6,499,108 B1 | 12/2002 | Johnson | |
| 6,577,735 B1 * | 6/2003 | Bharat | 380/286 |
| 6,578,146 B2 | 6/2003 | Johnson | |
| 7,080,260 B2 | 7/2006 | Johnson | |

* cited by examiner

*Primary Examiner*—Gilberto Barron, Jr.
*Assistant Examiner*—Virginia Ho
(74) *Attorney, Agent, or Firm*—Head, Johnson & Kachigian, P.C.

(57) ABSTRACT

Remote configuration and utilization of a virtual tape management system via communication of encrypted data. At least one security administrator CPU is communicably attached to a virtual tape management CPU. At least one remote data storage CPU is communicably attached to the virtual tape management CPU and to the security administrator. First software within the virtual tape management CPU validates authorized remote access to at least one remote data storage CPU and encrypts the data. Second software facilitates remote configuration and utilization of the virtual tape management CPU. At least one hardware adaptor card connects the virtual tape management CPU to a host.

11 Claims, 5 Drawing Sheets

Server Initialization      Figure 2

| 201 | Driver | Initialize module-wide variables utilized by Driver. |
|---|---|---|
| 202 | Driver | Enumerate adaptors using the adaptor's vendor and device IDs. |
| 203 | Driver | Initialize adaptor-specific variables utilized by Driver. |
| 204 | Driver | Allocate/reserve adaptor resources |
| 205 | Driver | Reset the adaptor. |
| 206 | Driver | Download microcode to the adaptor. |
| 207 | Driver | Initialize the adaptor. |
| 208 | Driver | Request a connection to each unique IRQ |
| 209 | Driver | Initiate a timer and timer support. |
| 210 | Driver | Expose standard module-wide support to applications. |
| 211 | Host DLL | Initialize variables utilized by Host DLL. |
| 213 | Host DDL | Expose and make available to SA, Adaptor specific Administrative instruction set. |
| 214 | Host DLL | Create a mutex (serialization mechanism) to be used by configuration support routines |
| 215 | Host DLL | Open (establishes communications with) the driver. |
| 216 | Host DLL | Request from the driver number of recognized adaptors. |
| 217 | Driver | Returns the number of adaptors in response to Host DLL request. |
| 218 | Host DLL | Request from the driver its version number. |
| 219 | Driver | Return the driver version number in response to the Host DLL request. |
| 220 | Host DLL | Record into SA log driver version and the number of adaptors it controls. |
| 221 | Host DLL | Indicate adaptor unavailability. |
| 222 | Host DLL | Load adaptor offline status. |
| 223 | Host DLL | Load adaptor activity status. |
| 224 | Host DLL | Load a second (independent) inactive configuration data sequence. |
| 225 | Host DLL | Ensure loaded adaptor configuration is within operational ranges. |

Server Termination        Figure 3

| 302 | Host DLL | Force adaptors offline. |
|-----|----------|-------------------------|
| 303 | Host DLL | Close the driver. |
| 304 | Host DLL | Free all allocated storage and resources. |
| 305 | Driver | Stop the one-second timer. |
| 306 | Driver | Eliminate the module-wide exposure of support to applications through NT. |
| 307 | Driver | Ensure/cause each adaptor to be offline to the channel and reset the adaptor. |
| 308 | Driver | Disconnect all previously connected IRQs (through NT). |
| 309 | Driver | Destroy each adaptor object instance. |
| 312 | Driver | Free all allocated storage and resources. |

Adaptor Configuration Load           Figure 4

| 401 | Host DLL | Indicate adaptor unavailability. |
| --- | --- | --- |
| 403 | Host DLL | Record Adaptor load. |
| 404 | Host DLL | Determine empty/active configuration |
| 405 | Host DLL | Request driver configuration of adaptor. |
| 406 | Driver | Ensure/cause the adaptor to be offline to the channel. |
| 409 | Driver | Free all allocated storage and resources. |
| 411 | Driver | Request that the adaptor be brought online to the channel. |
| 412 | Host DLL | Indicate adaptor is availability for device emulation |

SYSTEM AND METHOD FOR VIRTUAL TAPE MANAGEMENT WITH REMOTE ARCHIVAL AND RETRIEVAL VIA AN ENCRYPTED VALIDATION COMMUNICATION PROTOCOL

REFERENCE TO PENDING APPLICATIONS

This is a continuation application of Ser. No. 10/457,133 filed on Jun. 9, 2003 now U.S. Pat. No. 7,293,179.

This application is a continuation-in-part of (a) U.S. patent application Ser. No. 09/918,900 entitled "System, Method and Article of Manufacture To Remotely Configure And Utilize An Emulated Device Controller Via An Encrypted Validation Communication Protocol" filed on Jul. 31, 2001 now U.S. Pat. No. 6,578,146 and (b) U.S. patent application Ser. No. 09/971,244 entitled "System And Computer Based Method To Automatically Archive And Retrieve Encrypted Remote Client Data Files" filed on Oct. 4, 2001 now U.S. Pat. No. 7,080,260.

REFERENCE TO MICROFICHE APPENDIX

This application is not referenced by any microfiche appendix.

BACKGROUND OF THE INVENTION

1. Field of the Invention

The present invention related to a system and a method capable of emulating existing tape drive systems and to also remotely archive and retrieve data files via encrypted validation communication protocol.

2. Prior Art

It is necessary to store and backup data for many mainframe computer installations primarily for the purpose of safekeeping critical information to be used in the event of an unexpected loss of the primary copy. The backups are often remotely stored offsite of the mainframe installation.

At one time, ten inch, round reel tape drives were utilized on mainframe installations. The well known tape itself consists of a thin plastic base material with a coating of ferro-magnetic ferric oxide powder. The round reel tapes were physically transported to an offsite location. Periodically, the tapes would be returned and then reused.

In the 1980's, cartridge tape units replaced the round reel tape drives. The tape cartridge system had fewer moving parts and was less prone to failure. Additionally, the tape cartridge system occupies a smaller floor footprint and consumed less power than the round reel drives. Additionally, the media itself was improved over time. Denser recording techniques allowed the cartridges to be smaller, yet hold the same amount of data. To improve cataloging and indexing functions, and facilitate data accessibility, typically one data set is placed on one tape volume. Some tape data sets span multiple volumes while others occupy less than a single volume. This can result in a significant waste of tape as most data sets occupy only a small portion of the media and the rest of the volume remains unused. Estimates are that industry norms are for tape cartridges to be less than 50% utilized. With a cartridge tape system, the same procedures for physically pulling certain cartridges and moving them to an offsite location would be performed.

More recently, virtual tape servers have been introduced which place a controller between a mainframe and the cartridge tape devices and attach a disk cache area from and to which data can be read and written. The controller handles the migration of data between the disk cache and the tape media in an optimal space and time fashion. The data is actually being read from and to disks. The disks are typically faster than tape devices.

Information regarding tape volumes is stored in a tape catalog, maintained by a tape management system running on the host mainframe. The tape management system associates a particular tape using its primary identifier, the tape's volume serial number, with the data sets stored onto it along with its retention, or expiration date. In order to manage the re-use of tapes, the retention date indicates when the data on a tape is no longer required and at such point in time, the tape may have its data overwritten or "scratched" out. Scratch tape is a common mainframe term for a tape available to be written upon, regardless of its prior contents if any.

A scratch list is a report that is generally prepared on a daily basis that includes all of the volume serial numbers whose retention date expired on that day. A human typically refers to this report while walking through a tape library, pulling those tapes on the report so that they may be placed into the scratch pool for reuse. The tape management system imposes a safe guard against non-expired tapes being mounted in place of a scratch tape by comparing the tape's volume serial number against its catalog expiration date. This volume serial number, in addition to being hand written onto the exterior of the tape, is on the beginning of the tape prior to the start of data set information in a section known as a "header". When a scratch tape is mounted for writing, the tape management system inspects the tape catalog to verify that the tape is truly a scratch. If not, then it is rejected and a different scratch tape requested.

A vault list is a report prepared at some particular time interval that includes all of the volume serial numbers that are to be removed from the tape library and physically taken offsite. Mainframe data centers have the need to move or copy data to off site locations, primarily for the for the purpose of safe keeping critical information to be used in the event of an unexpected loss of the primary copy of that information. This typically involves physical transportation of the mainframe tapes, an error prone process in that sometimes all the required tapes are not sent or sometimes a tape sent in error that is later required to be retrieved in order to complete the processing of a mainframe job. Further, the data on these tapes is typically un-encrypted and therefore vulnerable to anyone being able to read it.

The tape management system is primarily used to cross-reference the location of a desired data set to a tape volume serial number. It is secondarily used to manage scratch lists and vault lists.

The present invention advances the art by allowing its practice to be supported via an encrypted communications protocol interfacing with, and relying upon, the teachings, practices and claims disclosed in U.S. Pat. No. 6,499,108 (hereinafter synonymously referred to as "Secure Agent™" or "SA").

Secure Agent Service Overview

The following overview is provided to facilitate a comprehensive understanding of the teachings of the instant invention. Secure Agent™ utilizes a secure login sequence wherein a client connects to a Secure Agent server using a key known to both systems and a client connects and presents the server with user identification (as used herein the term "client" refers synonymously to a remote user or component establishing, and communicating with the instant invention through Secure Agent allocation and encryption processes as taught in the above noted applications). If recognized, the Secure Agent server initiates a protocol whereby the client's identification is verified and subsequent communication is conducted within a secured (encrypted) construct. For purposes of this overview, the term "server" should be considered a hardware configuration represented as a central processing unit wherein Secure Agent, a host DLL and driver reside, and are executed. The term "DLL" as used herein refers to a Secure Agent host dynamically linked library (a.k.a. Host DLL). The term "DLL" or "dynamically linked library" is used in a manner consistent with that known to those skilled in the art. Specifically, the term "DLL" refers to a library of executable functions or data that can be used by a Windows™ or LINUX application. As such, the instant invention provides for one or more particular functions and program access to such functions by creating a static or dynamic link to the DLL of reference, with "static links" remaining constant during program execution and "dynamic links" created by the program as needed.

The Secure Agent server presents a variable unit of data, such as the time of day, to the client as a challenge. The client must then encrypt that data and supply it back to the server. If the server is able to decrypt the data using the stored client's key so that the result matches the original unencrypted challenge data, the user is considered authenticated and the connection continue. The key is never passed between the two systems and is therefore never at risk of exposure.

The initial variable unit of data seeds the transmission of subsequent data so that the traffic for each client server session is unique. Further, each byte of data transmitted is influenced by the values of previously sent data. Therefore, the connection is secure across any communication passageway including public networks such as, but not limited to, the Internet. The distance between the client and server is not of consequence but is typically a remote connection. For accountability purposes, the actions of a client may be recorded (logged) to non-volatile storage at almost any detail level desired.

The access rights of each client (what the client is able to accomplish during a session) is governed by data stored on the Secure Agent server to which the client is associated. As an example, such rights might encompass the ability to administer and utilize the services of the server system, which would, in turn, include capabilities such as adding new clients or components, changing a user's rights, transferring new code to the server, using a feature (or service) of the server and more.

Consequently, Secure Agent allows for the transmission of new code to the server and for that code to be implemented upon demand by a client. Such dynamic, real-time implementation in turn, allows for the behavior of the server to be modified. It is to this behavior modification the instant invention addresses its teachings, and thereby advances the contemporary art.

As will be readily appreciated by those skilled in the art, though the instant invention utilizes encryption/decryption and code recognition technology associated with Secure Agent, an alternative technology may be employed in support of the instant invention without departing from the disclosure, teachings and claims presented herein.

BRIEF SUMMARY OF THE INVENTION

The present invention is best viewed as comprised of six components with one or more sub-processes disclosed in association thereto. It can be further conceptualized that a distinguishable sub-process exists for each emulated tape device operating within the invention's tape emulator component. When one component desires to communicate to another component it assumes the role of a client when connecting to the other component's server. However, the roles of client and server are largely of consequence only in how it relates to validating the access of one component to another and the fact that the 'client' component is requesting a service offered by the 'server' component. The components are a tape emulator, remote data storage, archiver, virtual tape catalog, administrative tool, and host information.

The invention's virtual tape catalog component is a database repository of tape related information regarding each virtual tape used by the tape emulator. It is used to manage the disposition of tapes and is therefore much like a mainframe's internal tape catalog. The virtual tape catalog is crucial to the operation of the system and is therefore replicated to one or more remote locations. Along with the primary data element used to identify a specific virtual tape, the volume serial number, it indicates the information necessary to manage it such as:

Expiration date.
Scratch indicator.
Indicator that it should always be copied to remote data storage.
Indicator that it is ready to be copied to remote data storage.
The remote data storage target to which it should be copied.
Indicator that the source tape should be deleted after being copied to remote data storage (a move operation).
Indicator that it should always be copied to an archiver.
Indicator that it is ready to be copied to an archiver.
The archiver target to which it should be copied.
Indicator that the source tape file should be deleted after being copied to an archiver (a move operation).
The host processor dataset names that it contains.
The size of the tape file.
The date and time when it was created.
The date and time when it was last accessed.
The current locations of the tape file.
The date and time that it was transmitted to its current locations.
An indicator that it is currently in use.
The security groups to which it belongs.
Indicator that the tape file should be automatically retrieved upon a mount request if it happens to have been moved off the tape emulator component.
Indicates that it should be recovered to the tape emulator component.
Indicates it should be encrypted when created.
Encrypted indicator.

In addition to information specific to each tape, additional information is stored within the virtual tape catalog such as global configuration information and rules that govern the disposition of tapes. These include:

The central key phrase (password) used to encrypt the virtual tape images.
Certain dataset name patterns that, when encountered during the creation of a tape, cause a tape to be reassigned into specific security groups.
Periods of time that, when compared against when a tape is to be expired during the creation of a tape, cause a tape to be copied to remote data storage.
Periods of time that, when compared against when a tape is to be expired during the creation of a tape, cause a tape to be copied to an archiver.
Periods of time that, if a tape goes unaccessed by the host processor, that it will be moved to remote data storage.

Periods of time that, if a tape goes unaccessed by the host processor, that it will be moved to the archiver.

The invention's host information component provides tape catalog and tape mount information from the host processor by way of one of the tape emulator component's devices. The specific device may be any device type as is best suited for the facilities available to the host information component. Specific examples include 3480, through special commands or sequences, 3286 printer emulation or 3270 display emulation. Based on a unique communication sequence initiated by the host information component, this particular emulated device is able to recognize that it services the 'control path' and reacts accordingly.

The 'control path' between the host information component and the remainder of the invention is used to supply all information required from the host such as tapes to be scratched, tapes to be transmitted to vault, tape mount requests and tape retrieval (recall) requests. The information relating to tape scratches, tape vaulting and tape retrieval is collected periodically by the host information component from the host processor's tape catalog. The information relating to tape mount requests is collected as they occur, either by intercepting an operator message or by otherwise hooking into a host processor's tape mount user exit, a method by which a utility may gain useful information. For a tape to be scratched, vaulted or recalled the device correspondingly updates the virtual tape catalog. For a tape to be mounted the device relays the mount request to the emulated tape drive indicated in the request, parsing the request as necessary per the host processor's tape mount request message format. If, for whatever reason, the tape mount cannot be satisfied a message is sent up through the control path to the host information component in order that an operator message may be issued indicating the reason for being unable to service the request.

Additionally, state information maintained on behalf of the emulated tape device is updated to reflect the current status so that an administrator might be able to review it.

The invention's tape emulator component consists of lower level and higher level layers. The lower layer is a device driver communicating directly with one or more hardware adaptors attached to one or more computer systems, such as, but not limited to, mainframe computers (a.k.a. host processors). Illustrative non-limiting examples of such adaptors as used herein would include various ESCON adaptors, parallel channel adaptors, FICON adaptors, and SCSI adaptors. From the host processor's perspective the tape drive emulator's virtual drives are indistinguishable from real tape drives as it pertains to normal operations.

The driver controls the hardware in a manner prescribed by its design, causing it to interact with the other host processor computer systems to which it is connected as if it were one or more device types (emulation). The driver acts as a conduit to the higher layer that governs the overall behavior of the emulated devices.

The higher layer primarily supplies the driver with new data to provide through the emulated devices to the other computers to which it is connected and accepts data arriving to the emulated devices carried up by the driver. The higher layer manages the information repository against which the driver operates. Using the example of a 3480 tape drive, the higher layer's information repository represents a virtual tape. Mainframe reads and writes are serviced using the contents of this virtual tape. The virtual tape files reside on RAID disk drives, encrypted using a central key phrase specified by the security administrator. Therefore, the data stored onto the RAID devices is not useful when accessed outside of the present process, increasing data security.

Each instance of an emulated device is associated with unique security group information which, when compared against the security group contained within the virtual tape catalog for each tape, controls which tapes may be loaded on it. This security group comparison is performed upon receiving a tape mount request from the host information component. Additionally, if the tape requested is for a 'scratch' then such a tape is requested from the virtual tape catalog.

If a tape is not locally available, because it has been moved off of the tape emulator component by either the remote data storage or archiver components, then the mount may not be immediately satisfied. In this event a notification is made to the host information component. If the virtual tape catalog indicates that it should be automatically recalled then it will be updated to indicate such a recall should be performed; a priority event for the remote data storage component. In such an event the emulated device periodically inspects the virtual tape catalog to determine whether the tape has been recalled, continuing once it has.

Once an appropriate tape is locally available, exclusive access is ensured by comparing then setting its in use indicator within the virtual tape catalog. The virtual tape is then used as the emulated device's data repository. Upon being written, the virtual tape catalog is updated with the fact that it has been updated. As the content of a virtual tape are updated by the host processor, relevant information is updated in the virtual tape catalog.

By default a virtual tape that has been freshly written or created will receive the security groups of the device that created it. However, the administrative tool may be used to indicate certain dataset name characteristics that may be used to redirect the virtual tape into different security groups. Additionally, any other administration policies, such as might be applied based on the dataset names or expiration date, are applied.

When the tape is dismounted the last access date is updated in the catalog. It is then marked as no longer being in use within the virtual tape catalog, allowing the remote data storage and archiver components the ability to act upon it as necessary.

The invention's remote data storage component is primarily responsible for collecting a virtual tape image from a tape emulator. The remote data storage component, when idle, periodically requests tape movement criteria from the virtual tape catalog, prioritizing 'recall' requests for virtual tapes to be recovered from the remote data storage to the tape emulator.

Like each emulated tape device and each virtual tape, the remote data storage component is assigned to one or more security groups controlling which tapes it is able to transfer from the tape emulator. If a candidate tape doesn't have a matching security group then it is not considered for transfer and ignored.

Prior to a transfer it ensures dedicated access by comparing then setting the virtual tape's in use indicator within the virtual tape catalog. The virtual tape is then copied as per the virtual tape catalog. After the tape has been copied the virtual tape catalog is updated to reflect the virtual tape's locations and time it was copied. Additionally, if the operation was not a recall and was a move rather than a copy, it is then deleted off of the tape emulator. Finally, the virtual tape's in use indicator is cleared in the virtual tape catalog.

The invention's archiver component is conceptually similar to the remote data storage component, except its target media is permanent write-once storage, such as a robotic DVD burner or SCSI attached tape drives, rather than disk. The archiver, when idle, periodically requests tape movement criteria from the virtual tape catalog, prioritizing 'recall' requests for virtual tapes to be recovered from the archiver to the tape emulator.

Like each emulated tape device and each virtual tape, the archiver component is assigned to one or more security groups controlling which tapes it is able to transfer from the tape emulator or data storage components. If a candidate tape doesn't have a matching security group then it is not considered for transfer and ignored. In the case of a recall the archiver will scan a specific storage unit, such as a read-only DVD drive, to identify whether or not a volume to be recalled has been manually inserted.

Whenever removable media has been inserted into the archiver's reader unit, information relating to it, such as the volume serial number, will be provided for display by the administrative tool component. If a volume of interest is not inserted it will repeat checking the storage unit on a periodic basis. Recalls involve a copy from permanent storage to the tape emulator while non-recalls involve copies from a tape emulator or data storage component to a permanent, write-once storage unit.

Prior to transfer it ensures dedicated access by comparing then setting the virtual tape's in use indicator within the virtual tape catalog. The virtual tape is then copied as per the virtual tape catalog. After the tape has been copied the virtual tape catalog is updated to reflect the virtual tape's locations and time it was copied. Additionally, if the operation was not a recall and was a move rather than a copy, it is then deleted off of the tape emulator or remote data storage. Finally, the virtual tape's in use indicator is cleared in the virtual tape catalog.

An additional task performed by the archiver is, upon administrator demand, for the information regarding a virtual tape image to be constructed from removable media that has been inserted into the archiver's reader unit. Upon this event, the archiver will inspect the removable media for the volume serial number, ensure dedicated access by comparing then setting the virtual tape's in use indicator within the virtual tape catalog, creating the virtual tape catalog entry if an entry for the tape didn't exist. It will then update the virtual tape catalog with the information supporting the removable media's virtual tape image contents then clear the virtual tape's in use indicator in the virtual tape catalog.

The invention's administrative tool component provides a human administrator the ability to manage the behavior of the virtual tape system using Secure Agent™ administrative functions as taught by the afore noted pending patent applications and patents. Through their use a client administration application is able to establish a secured connection to the virtual tape catalog, tape emulator, remote data storage and archiver components.

Once connected, the administrator may view and manipulate configuration, policy and virtual tape information. The processes involved entail administrative criteria such as:

Setting up user IDs and their passwords.
Indicating where each component exists along with how (i.e. user ID and password) one component might connect to another.
Adding a component.
Removing a component.
Specifying the central key phrase (password) used to encrypt the virtual tape images.
Designating how many emulate devices are to exist.
How the devices are to be emulated (this might include information such as channel address and device type, information specific to the type of host processor to which the tape emulator component is attached).
Controlling the overall operation of emulated devices (such as recycling an adaptor connected to a host processor, commonly referred to as a Power On Reset or, more simply, a POR).
Dismounting a virtual tape from an emulated device.
Specifying the IPs.
Specifying the archiver to which new tapes should be copied, if any.
Managing the security groups to which an emulated device belongs.
Managing the security groups to which a remote data storage component belongs.
Managing the security groups to which an archiver component belongs.
Configuring which archival devices are available to the archiver component.
Initializing the tape catalog with a range of virtual tapes to be used.
Adding or removing virtual tapes.
Specifying certain dataset name patterns that, when encountered during the creation of a tape, cause a tape to be reassigned into specific security groups.
Specifying periods of time that, when compared against when a tape is to be expired during the creation of a tape, cause a tape to be copied to remote data storage.
Specifying periods of time that, when compared against when a tape is to be expired during the creation of a tape, cause a tape to be copied to an archiver.
Specifying periods of time that, if a tape goes unaccessed by the host processor, that it will be moved to remote data storage.
Specifying periods of time that, if a tape goes unaccessed by the host processor, that it will be moved to the archiver.
Determining what virtual tapes are desired for recall from remote data storage.
Determining what virtual tapes are desired for recall from an archiver, therefore requiring manual intervention by a human inserting archived media into the archiver reader unit.
Restoring a virtual tape image from removable media which has been inserted into the archiver reader unit, updating the virtual tape catalog based on its information.
Retrieve a virtual tape file in an unencrypted form, exporting it from the virtual tape system.
Changing specific information within the virtual tape catalog for any tape, such as:
Expiration date.
Scratch indicator.
Indicator that it should always be copied to remote data storage.
Indicator that it is ready to be copied to remote data storage.
The remote data storage target to which it should be copied.
Indicator that the source tape should be deleted after being copied to remote data storage (a move operation).
Indicator that it should always be copied to an archiver.
Indicator that it is ready to be copied to an archiver.
The archiver target to which it should be copied.
Indicator that the source tape file should be deleted after being copied to an archiver (a move operation).
The current locations of the tape file.
The security groups to which it belongs.

Indicator that the tape file should be automatically retrieved upon a mount request if it happens to have been moved off the tape emulator component.

Indicates that it should be recovered to the tape emulator component.

Indicates it should be encrypted when created.

Consequently, it is a principle object of the instant invention to provide a system and method for a virtual tape system which will connect to mainframe hosts which will emulate multiple types of tape drive systems.

Another object of the invention is to copy tapes to a remote data storage component in order to address the requirement for offsite backup of critical host processor data.

Another object of the invention is to copy tapes to permanent (more than ten years) read-only removable archival media or SCSI attached tape devices for critical host processor data, further providing the ability to restore these archived tapes as required.

Another object of the invention is to interface with the host processor in such a manner as to receive from it information necessary both to properly update a virtual tape catalog, so that it corresponds with the host processor's catalog, and to satisfy tape mount requests.

A further object of the instant invention to provide for a secured logon sequence utilizing encrypted data transmission in accordance with the teachings, disclosure and claims of the above noted pending patent applications.

Another object of the present invention is a method to migrate and encrypt existing remote backup tapes to the present VTS backup.

Yet another object of the instant invention is to ensure that all data transferred external of the emulated virtual tape system controller is encrypted in accordance with the teachings of the above noted pending patent applications.

A further object of the instant invention is to provide the ability for a security administrator to alter and manage the configuration of virtual tape systems and remote offsite backup systems.

An additional object of the present invention is to provide the capability by which an administrator may add and remove one or more offsite backup systems with respect to emulated virtual tape system allocation.

Another object of the instant invention is to provide support for multiple device types which may be simultaneously supported and operated.

Another object of the invention is to utilize RAID technology for disk storage reliability wherever virtual tape images or virtual tape catalog is located.

Responsive to the foregoing challenges, the Applicant has developed an innovative system and method to remotely configure and utilize an emulated virtual tape system via an encrypted validation communication protocol.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

BRIEF DESCRIPTION OF THE DRAWINGS

FIG. 2 is a logic flow diagram illustrating processing steps associated with the server initialization processing subcomponent of the instant invention when practiced in its preferred embodiment.

FIG. 3 is a logic flow diagram illustrating processing steps associated with the server termination processing subcomponent of the instant invention when practiced in its preferred embodiment.

FIG. 4 is a logic flow diagram illustrating processing steps associated with the adaptor configuration load processing subcomponent of the instant invention when practiced in its preferred embodiment.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
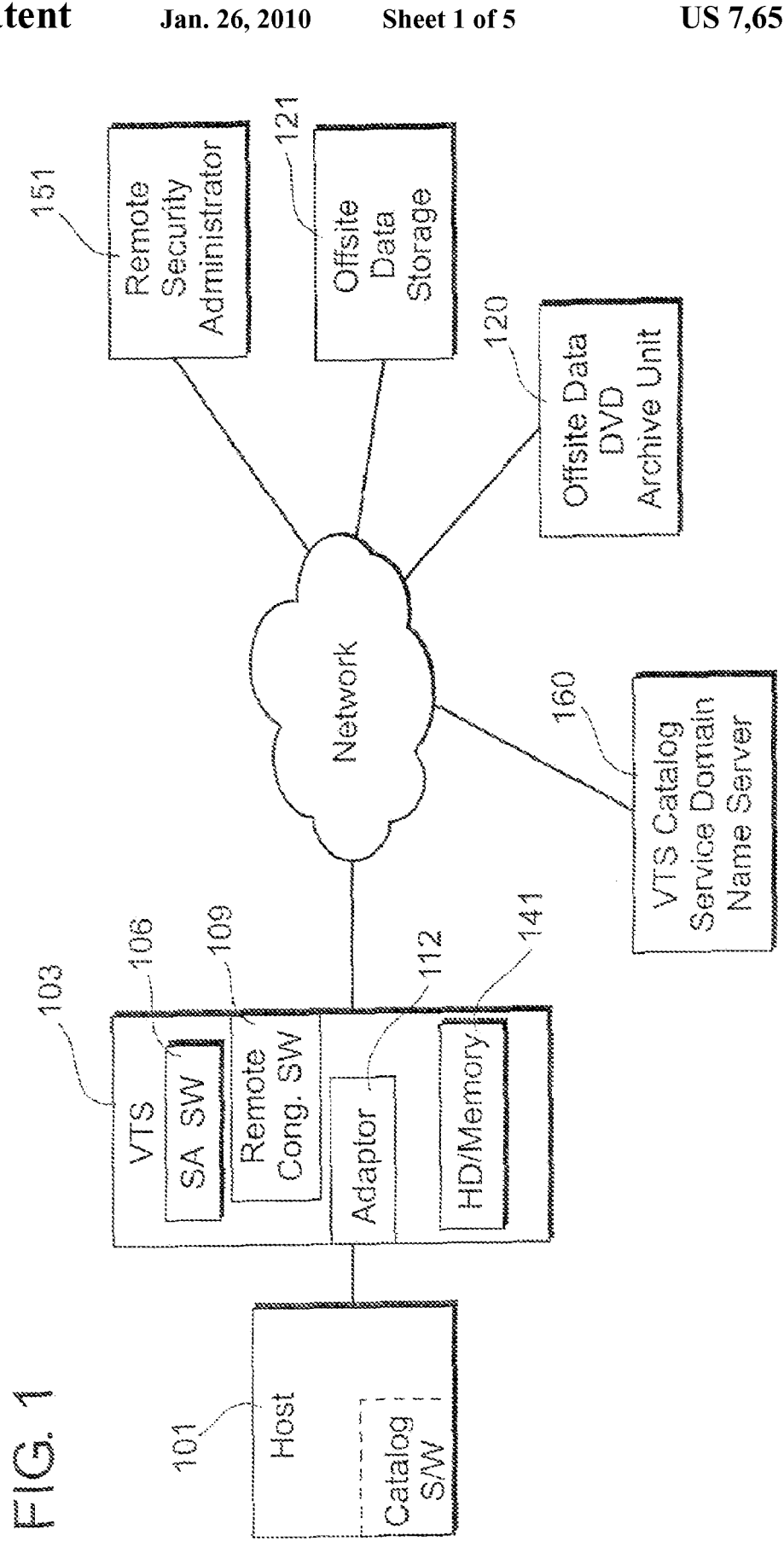
FIG. 1 is a system schematic providing a conceptual overview of primary hardware and software components of the instant invention as practiced in its preferred embodiment.

FIG. 1 illustrates a simplified schematic diagram of the components of the present invention. A mainframe host computer 101 may be executing various operating systems such as MVS, VM, VSE, LINUX or UNIX. The mainframe host computer 101 may also include a tape catalog.

The system includes a virtual tape system (VTS) 103 which has executing under control of its control program, Secure Agent software 106. The present invention advances the art and improves upon technology taught and claimed in the above noted pending patent applications, said applications and teachings incorporated by reference herein. The VTS server 103 also has operating under control of its control program remote configuration software 109. Embodied within the VTS server 103 is a hardware adaptor card 112. The adaptor card 112 is in turn communicably attached to one or more host processors such as host processor 101. As used herein, the term "adaptor" refers synonymously to those hardware configurations such as, but not limited to, "adaptor cards" which allow for connectability between two or more central processing units and the transference of data associated therewith. Illustrative non-limiting examples of such adaptors as used herein would include various ESCON adaptors, parallel channel adaptors, FICON adaptors and SCSI adaptors.

The VTS 103 also includes a hard drive 141 or hard drives with a memory or memories.

Also shown in FIG. 1 is a Security Administrator client 151 interactively communicating with the Secure Agent software 106 operating within the VTS server 103. As will be discussed in further detail and in association with FIGS. 2 through 7, the Security Administrator 151 utilizes Secure Agent software 106 to administer and maintain user/resource profiles 157 and further communicates with information conveyed to said Secure Agent software 106 vis the software processes associated with the remote configuration software 109 of the instant invention. The Security Administrator controls the configuration of one or more of the VTS devices and also controls access to remote off site backup devices to be described.

The present invention also includes one or more remote data storage client devices, such as remote data client storage 121 with disk storage and remote data client storage 124 with DVD archive unit, each of which is connected to the virtual tape system 103 through a network.

The following discussion in association with FIG. 1 provides a brief non-limiting synopsis of the teachings of the instant invention and generally discusses the interrelationships of hardware and software processing components of the instant invention. In FIG. 1, a Security Administrator 151 defines via Secure Agent software 106, user and resource profiles. Such profiles are stored in a non-volatile storage medium, such as but not limited to, a disk drive. User resource records are those records which typically define security group or groups, and access control variables associated with the user. Stated succinctly, the user resource record/profile defines those resources that the user may utilize and the bounds of such utilization. The Security Administrator 151 may also define resource profiles, such resource profiles define the device type and grouping of emulated input/output devices as well as central processing unit designations associated with each emulated device type and/or grouping. When attempting to establish a session between a VTS 103 and any one of the remote offsite data storage client devices via a communications network 148, the remote data storage device communicates first with Secure Agent software 106 operating within the VTS server 103 of the instant invention 109. As indicated, the processing subcomponents of the instant invention further include Adaptor Configuration Load, Client Communication, Client Termination, Administration, Server Initialization and Server Termination subprocesses. It is to such subprocesses FIGS. 2 through 5 address themselves. A more detailed disclosure of each subprocess follows.

Server Initialization, FIG. 2

FIG. 2 discloses in further detail the process steps in which the VTS server of the instant invention is initialized. While discussion of the individual subprocesses is provided in an illustrative logic sequence, it is to be noted that process steps defined therein need not occur in a serial manner. Rather it is expressly recognized that many of the subprocesses execution steps may be executed in a concurrent manner, or have their execution sequence factored upon the statusing of a previously executed process step.

With respect to server initialization, the driver of the instant invention first initializes all driver module-wide variables, such as clearing out how many adaptors are being supported, as shown at step 201. Once these variables have been initialized, adaptors are located by enumerating all peripheral component interconnect computer Bus-type (PCI) devices present in the system using data and techniques published by the PCI Special Interest Group and by Microsoft's Window's NT Device Driver Kit (DDK) and Linux Device Driver Development Documentation. Specifically, the adaptor vender and device IDs as shown at 202 are referenced to identify the presence of such supported adaptors. For each adaptor located, adaptor specific variables are initialized by the driver 203, with the resources used by the adaptor, such as buffer areas and IRQ (interrupt request lines) being next allocated and reserved 204 using functions provided by DDK. The adaptor is then reset 205 by the driver using a technique made known by the adaptor's manufacturer. Since these adaptors are generally intelligent it is necessary to transfer (download) to them microcode (a manufacturer-supplied program specific to such a device) that controls internal instruction sequencing. Therefore, microcode is downloaded into the adaptor 206 in a manner prescribed by the adaptor manufacturer with the adaptor then considered initialized 207. The driver next requests a connection to each IRQ so that any interrupts generated by any of the recognized adaptors may be serviced by the driver 208 and next initiates timer support 209 so that approximately once every second, general operations may be performed on behalf of each adaptor. This support typically, though not limitedly, includes ensuring an adaptor does not generate a non-detected interrupt. Having once initiated its timer 209, the driver next exposes standard module-wide support to all applications 210, which allows for communications with the driver as to be established by the Host DLL.

Subsequent to the driver initialization, the Host DLL initializes variables it utilizes 211. In addition, at this stage linkage to configuration support routines within the Host DLL is also established. As practiced in one embodiment of the invention, the root name of the administrative tree structure is exposed to Secure Agent indicating that the Host DLL supports the configuration of information and will respond in a positive manner to requests for information and management of branches under this particular root. The Host DLL next creates a mutex serialization mechanism to be used by configuration support routines during access of adaptor configuration data to insure data integrity 214. This serialization mechanism is used to prevent for example potential simultaneous updates by multiple administrators as well as to prevent a client from enumerating emulated devices while it is being manipulated.

The Host DLL continues to open or otherwise establishes communication with the driver 215 and requests from it a number of recognized adaptors 216 to which the driver responds 217, whereupon the Host DLL requests from the driver its version number 218 to which the driver also responds 219. The Host DLL then records into a Secure Agent log the driver version and the number of adaptors it controls 220, and proceeds to indicate that each adaptor is not yet in a condition to support emulated device operation 221. Data representing the adaptor configuration to be utilized (the active configuration) is next loaded 223. This data specifies device types and number of devices to be emulated, in conjunction with user-friendly (readable) names and security groups for each such emulated device. A second unique set of this data is loaded (the inactive configuration) 224 on behalf of this same adaptor to be used as a work area for administrators. This allows administrators to accumulate a series of configuration changes prior to effecting the activation of those changes as a whole. During said initialization, the Host DLL lastly ensures that the loaded adaptor configurations are within operationally permissible parameters 225.

FIG. 3 is a logic flow diagram illustrating processing steps associated with the server termination processing subcomponents of the instant invention as practiced in its preferred embodiment.

In FIG. 3 with respect to server termination, recognized adaptors are then set offline to their channels through the Adaptor Configuration Load processing subcomponent 302. The Host DLL next ceases communication, or closes the driver 303, and frees all allocated storage and resources 304. The one second timer is then closed by the driver 305 and module-wide exposure of support to application through NT is eliminated 306. The driver then ensures/verifies each adaptor is offline to the channel and the adaptor is reset 307, disconnects all previously connected IRQ's 308, and destroys each object instance 309. Such destruction further includes but is not limited to elimination of exposure of the emulated devices and the freeing of all allocated storage and resources 312.

FIG. 4 is a logic flow diagram illustrating the processing steps associated with the Adaptor Configuration Load processing subcomponent of the instant invention as practiced in its preferred embodiment.

In FIG. 4, the Host DLL first indicates the adaptor's unavailability 401 and for each emulated device currently connected on this adaptor, performs the required ending sequence. The Host DLL continues by next recording into Secure Agent log the configuration for this adaptor is being loaded 403 and if the adaptor is to be forced offline to the mainframe to which it is connected 404, prepare and uses an empty configuration indicating that emulated devices are not to be emulated during this session. If the adaptor is not to be forced offline, an active configuration for the adaptor is provided and a request that the adaptor using the active configuration data is imitated 405. The driver as instructed causes the adaptor to be offline to the channel at this stage in the adaptor configuration load 406, causing or eliminating the exposure of emulated devices and frees all allocated storage and resources 409. The driver next determines if emulated devices are to be emulated 410 and then request that the adaptor be brought online to the channel 411, lastly indicating that the adaptor is available for device emulation use 412.

The Virtual Tape System (VTS) Catalog is a repository of tape related information maintained on a secured name server 160 that is used by the VTS to manage the disposition of its tapes and is much like the mainframe's tape catalog. In fact, information from the mainframe tape catalog is periodically provided to the VTS so that it might update the VTS Catalog. Specifically, each time a tape image is created, information on that tape image is placed in the VTS catalog. Each time a tape image is moved to archive, that information is placed in the VTS catalog.

The VTS includes a component that is installed and executes upon, or 'inboard', the mainframe computer. The purpose of this inboard component is to transmit information to the VTS, accomplished by it allocating one of the VTS's emulated devices and communicating through it in order to transfer such things as the scratch list and vault list, both retrieved from the mainframe's tape catalog.

Additionally, tape mount messages that indicate the tape volume serial number to be mounted upon a particular drive are also transferred through this interface. The interface may be accomplished through either of two means. First, it may be implemented by way of unique commands to a VTS emulated tape drive that are otherwise unused during the normal course of tape operations. When these unique commands are received they are inspected for validity and its contents retrieved. Second, it may be implemented by way of the normal transfer of data to another emulated device type such as a 3286 printer or 3270 display. These latter approaches require that the normal device data streams be parsed as necessary in order to extract the desired information from them.

The receipt of the tape scratch list causes the VTS Catalog to be updated to reflect which tapes are now considered scratch candidates while the receipt of the vault list causes the VTS Catalog to be updated to reflect which tapes are to be transmitted to the offsite data storage component.

In addition to the information in the VTS Catalog that is modified by the inboard component, the transmission of tapes from the emulated device unit to the offsite data storage component, and vice versa, is reflected in the same VTS Catalog. Therefore, all of the information regarding a specific tape is retained in the VTS Catalog.

Finally, the information within the VTS Catalog may be controlled by a user that connects into the VTS as an administrator. As an example, the administrator may perform such tasks as instructing that a particular tape image should be recovered from the offsite data storage component to the emulated device unit for a later anticipated mount.

Administrative Configuration

When an administrator desires to modify the configuration of adaptors managed by the Host DLL, it issues requests for enumeration of the "/Adaptors" root and its branches to which the Host DLL will respond. This provides the administrator with the means necessary to discover what information exists to be changed. The data exposed through these branches correlates to the data within the active and inactive configurations for each adaptor.

Once supplied with the name and value of a piece of adaptor configuration data an administrator can decide whether or not to make changes to it and, if so, supply that name with a new value back to the Host DLL which will then make that change on the administrator's behalf.

Additionally, an administrator may enumerate a series of controls that can be employed for special actions by the Host DLL against an adaptor. Specifically, an administrator might decide to activate the inactive configuration, whereupon the Host DLL will exchange the data of the active configuration with that of the inactive configuration then perform the actions detailed with Adaptor Configuration Load, FIG. 4. If, on the other hand, an administrator opted to copy the contents of the active configuration into that of the inactive configuration then the Host DLL would perform that action. An administrator also has the option to simply clear out the inactive configuration whereupon the Host DLL would reinitialize it to reflect the absence of configured emulated devices. If an administrator decided it was necessary to reinitialize the adaptor then he could specify that the Host DLL do so whereupon it would perform the actions detailed with Adaptor Configuration Load, FIG. 4. Finally, if an administrator decided that an adaptor should be kept offline or could come back online then he could request that of the Host DLL and it would toggle that state for the adaptor then perform the actions detailed with Adaptor Configuration Load, FIG. 4.

Figure 5:
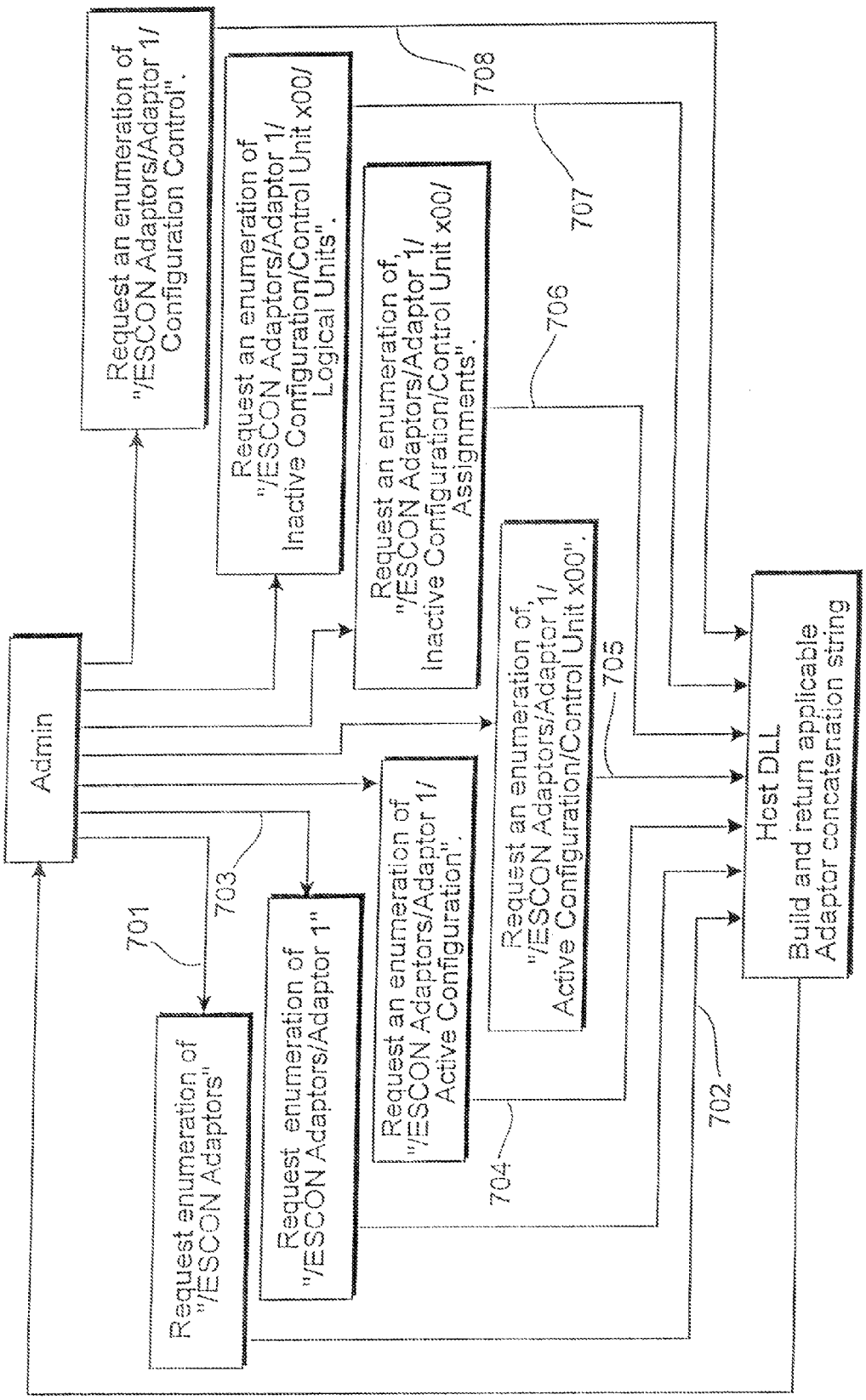
FIG. 5 is a logic flow diagram illustrating processing steps associated with administrative functions given illustrative user response/input strings.

FIG. 5 is a logic flow diagram illustrating processing steps associated with administrative functions given non-limiting examples of user input command strings.

Administration of Adaptor Configuration Data: Input Request=Enumerate Branch/Adaptors Administrator requests an enumeration of "/ESCON Adaptors" 701.

Host DLL builds and returns a string consisting of a concatenation of all the adaptors, in the form of Adaptor# where # is the 1-based number of the adaptor, along with a flag for each indicating that each element has, in turn, more branches 702.

Administration of Adaptor Configuration Data: Input Request=Enumerate Branch/Adaptors/Adaptor#

Administrator requests an enumeration of, for example, "/Adaptors/Adaptor 1" 703.

Host DLL builds and returns a string consisting of a concatenation of "Active Configuration" and "Inactive Configuration", each with a flag for each indicating that they have, in turn, more branches, along with a string of "Configuration Control" with a flag indicating that it has values 702.

Administration of Adaptor Configuration Data: Input Request=Enumerate Branch/Adaptors/Adaptor#/(In)Active Configuration Administrator requests an enumeration of, for example, "/Adaptors/Adaptor 1/Active Configuration " 704.

Host DLL builds and returns a string consisting of a concatenation of 16 CUs, in the form of Control Unit x## where ## is hexadecimal from 00 through 0F, along with a flag for each indicating that each element has, in turn, more branches 702.

Administration of Adaptor Configuration Data: Input Request=Enumerate Branch/Adaptors/Adaptor#/(In)Active Configuration/Control Unit x##

Administrator requests an enumeration of, for example, "/Adaptors/Adaptor 1/Active Configuration/Control Unit x00" 705.

Host DLL builds and returns a string consisting of a concatenation of "Assignments" and "Logical Units", each with a flag indicating that they have values 702.

Administration of Adaptor Configuration Data: Input Request=Enumerate Branch/Adaptors/Adaptor#/(In)Active Configuration/Control Unit x##/Assignments Administrator requests an enumeration of, for example, "/Adaptors/Adaptor 1/Inactive Configuration/Control Unit x00/Assignments" 706.

Host DLL builds and returns a string consisting of a concatenation of the following: 702

A. "Controller Type" with a flag indicating the data presentation to be a drop-down box. This includes a list of all of the valid CUTypes (i.e. 7412, 3174) along with the currently assigned value. This value is taken from the specified Adaptor configuration data for this adaptor, indexed to the specified control unit.

B. "Base Address" with a flag indicating the data presentation to be a text box. This includes the currently assigned value. This value is taken from the specified Adaptor configuration data for this adaptor, indexed to the specified control unit.

C. "Device Count" with a flag indicating the data presentation to be a text box. This includes the currently assigned value. This value is taken from the specified Adaptor configuration data for this adaptor, indexed to the specified control unit.

D. If the specified Adaptor configuration is the active configuration then a flag is added to all fields marking them as non-modifiable meaning that this data cannot be changed. For these particular datas only that within the inactive configuration may be worked upon.

Administration of Adaptor Configuration Data: Input Request=Enumerate Branch/Adaptors/Adaptor#/(In)Active Configuration/Control Unit x##/Logical Units Administrator requests an enumeration of, for example, "/Adaptors/Adaptor 1/Inactive Configuration/Control Unit x00/Assignments" 707.

Host DLL builds and returns a string consisting of a concatenation of the following: 702

A. For each emulated devices per Logical Unit Count for the specified Adaptor configuration data for this adaptor, indexed to the specified control unit (the following uses of ## is the current Logical Unit Count entry+the Logical Unit Base, providing the emulated devices address as it appears to the mainframe.):

1. "Device x## Name(s)" with a flag indicating this is a text box. This includes the currently assigned value per the specified Adaptor configuration data for this adaptor, indexed to the specified CU and emulated devices per the current Logical Unit Count entry.

2. "Device x## Group(s)" with a flag indicating this is text box. This includes the currently assigned value per the specified Adaptor configuration data for this adaptor, indexed to the specified CU and emulated devices.

3. If the specified Adaptor configuration is the active configuration:
   a. "Device x## Status" with a flag indicating this is text box. The emulated devices values involved are per the specified Adaptor configuration data for this adaptor, indexed to the specified CU and emulated devices per the current Logical Unit Count entry. This field is marked as non-modifiable meaning that this data cannot be changed (informational only).

Administration of Adaptor Configuration Data: Input Request=Enumerate Branch/Adaptors/Adaptor#/Configuration Control Administrator requests an enumeration of, for example, "/Adaptors/Adaptor 1/Configuration Control" 708.

Host DLL builds and returns a string consisting of a concatenation of the following: 702
- A. "Check this then click save to activate the inactive config" with a flag indicating this is a check box and a value of unchecked.
- B. "Check this then click save to copy the inactive config to the inactive" with a flag indicating this is a check box and a value of unchecked.
- C. "Check then then click save to purge the inactive config" with a flag indicating this is a check box and a value of unchecked.
- D. "Check this then click save to POR the adaptor" with a flag indicating this is a check box and a value of unchecked.
- E. "Force adaptor offline" with a flag indicating this is a check box. This includes the currently assigned value per the specified Adaptor configuration data for this adaptor.

Continuing with non-illustrated, non-limiting examples of Administrative processing functionality.

Administration of Adaptor Configuration Data: Data Assignment of a /Adaptors/Adaptor#/(In)Active Configuration/Control Unit x##/Logical Units Value Administrator
1. Requests an assignment of any modifiable value under "/Adaptors/Adaptor#/(In)Active Configuration/Control Unit x##/Logical Units" providing the new value along with the path to the data name.

Host DLL
2. Assigns the specified data of the adaptor, indexed to the specified CU and Logical Unit, to the provided vale.
3. Saves the data to non-volatile storage through SA.

Administration of Adaptor Configuration Data: Data Assignment of a /Adaptors/Adaptor#/(In)Active Configuration/Control Unit x##/Assignments Value 1. Administrator requests an assignment of any modifiable value under "/Adaptors/Adaptor#/(In)Active Configuration/Control Unit x##/Assignments", providing the new value along with the path to the data name.

Host DLL
2. Ensures that every Logical Unit Base and Logical Unit Count is within the ranges established (and published) as acceptable to the adaptors and IBM mainframe computers. If not then reject the change
3. Assigns the specified data of the adaptor, indexed to the specified CU, to the provided value.
4. Saves the data to non-volatile storage through SA.

Administration of Adaptor Configuration Data: Admin checked /Adaptors/Adaptor#/Configuration Control/Check This Then Click Save To Activate the Inactive Config 1. Administrator requests to activate the inactive configuration of the specified adaptor.

Host DLL
2. Uses the configuration datas for the specified adaptor.
3. Indicates that the adaptor is unavailable for device emulation.
4. Exchanges the contents of the active configuration with that of the inactive configuration.
5. Saves the configurations to non-volatile storage through SA.
6. Performs Adaptor Configuration Load.

Administration of Adaptor Configuration Data: Admin checked /Adaptors/Adaptor#/Configuration Control/Check This Then Click Save To Copy the Inactive Config To the Inactive 1. Administrator requests to copy the active configuration to the inactive configuration of the specified adaptor.

Host DLL
2. Uses the configuration datas for the specified adaptor.
3. Copies the contents of the active configuration into the inactive configuration.
4. Saves the inactive configuration to non-volatile storage through SA.

Administration of Adaptor Configuration Data: Admin Checked /Adaptors/Adaptor#/Configuration Control/Check Then Then Click Save To Purge the Inactive Config 1. Administrator requests to purge the inactive configuration of the specified adaptor.

Host DLL
2. Uses the inactive configuration data for the specified adaptor.
3. Clear it out to default values as does Start Server when a configuration doesn't exist. In summary, all of the CUTypes are assigned to 7412 and everything else is assigned to 0.
4. Saves the inactive configuration to non-volatile storage through SA.

Administration of Adaptor Configuration Data: Admin Checked /Adaptors/Adaptor#/Configuration Control/Check This Then Click Save To POR the Adaptor Administrator requests to perform a Power On Reset (POR, or an offline/online recycle) of the specified adaptor.
Host DLL performs Adaptor Configuration Load for the specified adaptor.

Administration of Adaptor Configuration Data: Admin Checked /Adaptors/Adaptor#/Configuration Control/Force Adaptor Offline Administrator
1. Requests a change to the flag that controls whether or not the adaptor is to be forced offline to the mainframe to which it is connected.

Host DLL
2. Assigns the supplied setting to the data for the specified adaptor.
3. Saves the value to non-volatile stored through SA.
4. Performs Adaptor Configuration Load.

The Security Administrator central processing unit has system software which is communicably attached through the network to the virtual tape system central processing unit and is also connected through the network to a remote data storage 121. The Security Administrator 151 may also be attached to a remote archiver component with such devices as DVD or SCSI tapes. The archive device may take various forms such as a mass storage unit or other similarly intended structures designed to accommodate the storage and retrieval of digitized data. The present invention allows for one or more backup archives data storage devices.

A VTS catalog may be maintained at a secure name server or secure domain name server 160.

The Security Administrator 151 can define a volume or set of volumes to be archived which are to be stored in the data storage devices 121 or 124. To provide parameters for the backup, the The Security Administrator 151 specifies those volumes and directories and/or files to be backed up, the frequency and time of day at which the specified files are to be backed up, an encryption key for the backup data set, and the identification of the particular storage CPU desiring to be used.

Once the VTS server has connected with the remote data storage such as device 121, software operating within the VTS encrypts data to be transmitted to the remote data storage according to a generated encryption key.

From the mainframe's perspective the tape drive emulator's virtual drives are indistinguishable from real tape drives as it pertains to normal operations. Disk files are created on RAID drives to represent tapes. These virtual tape images are encrypted using a central key phrase specified by the security administrator. Therefore, the data stored onto the RAID devices is not useful when accessed outside of the present process, increasing data security. The tape drive emulator is usually connected via a network to a remote data storage component for the purpose of accomplishing the requirements of offsite data storage. The actual location of this offsite storage component doesn't matter as standard network connectivity is employed, under the control of Secure Agent, for communication. The offsite storage component, like the tape drive emulator, utilizes RAID storage.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

It will be apparent to those skilled in the art that various modifications and variations can be made in the construction, configuration, and/or operation of the present invention without departing from the scope or spirit of the invention. For example, in the embodiments mentioned above, variations in the materials used to make each element of the invention may vary without departing from the scope of the invention. Thus, it is intended that the present invention cover the modifications and variations of the invention provided they come within the scope of the appended claims and their equivalents

What is claimed is:

1. A system to facilitate virtual tape management of data and remote backup, archival, and retrieval of said data via communication of encrypted data comprising:
   a virtual tape management central processing unit;
   at least one remote data storage central processing unit communicably attached to said virtual tape management central processing unit;
   first software for validating authorized remote access to at least one remote data storage and for encryption of data, said first software executing from within said virtual tape management central processing unit;
   second software for facilitating remote configuration and utilization of said virtual tape management central processing unit;
   at least one hardware adaptor card communicably attached to said virtual tape management central processing unit; and
   at least one host processor central processing unit communicably attached to said virtual tape management central processing unit via said hardware adaptor card.

2. The system to facilitate virtual tape management of data in accordance with claim 1 wherein said virtual tape management central processing unit includes a hard drive and memory.

3. The system to facilitate virtual tape management of data in accordance with claim 1 including a virtual tape system catalog storing tape related information, said catalog being updated on creation of a tape image, and on movement of a tape image.

4. The system to facilitate virtual tape management of data in accordance with claim 1 wherein said virtual tape management central processing unit supports multiple device types which may be simultaneously supported and operated.

5. The system to facilitate virtual tape management of data as set forth in claim 1 wherein said remote data storage central processing unit or said virtual tape management central processing unit is communicably attached to an archiver component.

6. The system to facilitate virtual tape management of data in accordance with claim 1 wherein said first software is receptive to and processes data communicated from said second software.

7. The system to facilitate virtual tape management of data in accordance with claim 1 wherein said second software is receptive to and processes data communicated from said first software.

8. The system to facilitate virtual tape management of data in accordance with claim 1 further comprising a communication means wherein data exchanged between said remote data storage central processing unit and said virtual tape management central processing unit is encrypted prior to transmission between said central processing units and decrypted subsequent to transmission between said central processing units.

9. A computer based method for facilitating remote configuration and utilization of a virtual tape management system for remote backup, archival and retrieval of data via communication of encrypted data comprising:
   (a) initializing and communicating with a virtual tape management central processing unit;
   (b) establishing a connection between said virtual tape management central processing unit and a remote data storage CPU;
   (c) managing a virtual tape system catalog containing information on each virtual tape image;
   (d) disconnecting said previously connected remote data storage CPU; and
   (e) terminating communication with said virtual tape management central processing unit.

10. A system to facilitate virtual tape management of data and remote backup, archival, and retrieval of said data via communication of encrypted data comprising:
   at least one security administrator central processing unit communicably attached to a virtual tape management central processing unit;
   at least one remote data storage central processing unit communicably attached to said virtual tape management central processing unit and to said security administrator;
   first software for validating authorized remote access to at least one remote data storage and for encryption of data, said first software executing from within said virtual tape management central processing unit;

second software for facilitating remote configuration and utilization of said virtual tape management central processing unit;

at least one hardware adaptor card communicably attached to said virtual tape management central processing unit;

at least one host processor central processing unit communicably attached to said virtual tape management central processing unit via said hardware adaptor card; and a virtual tape system catalog storing tape related information, said catalog being updated on creation of a tape image, and on movement of a tape image wherein said catalog is automatically backed up to one or more remote locations.

11. A system to facilitate virtual tape management of data and remote backup, archival, and retrieval of said data via communication of encrypted data comprising:

at least one security administrator central processing unit communicably attached to a virtual tape management central processing unit;

at least one remote data storage central processing unit communicably attached to said virtual tape management central processing unit and to said security administrator;

first software for validating authorized remote access to at least one remote data storage and for encryption of data, said first software executing from within said virtual tape management central processing unit;

second software for facilitating remote configuration and utilization of said virtual tape management central processing unit;

at least one hardware adaptor card communicably attached to said virtual tape management central processing unit; and at least one host processor central processing unit communicably attached to said virtual tape management central processing unit via said hardware adaptor card, wherein said remote data storage central processing unit or said virtual tape management central processing unit is communicably attached to an archiver component which imports and exports both encrypted and unencrypted medias.

* * * * *